United States Patent [19]

Bolen

[11] 4,130,152
[45] Dec. 19, 1978

[54] SLOT-HEAD FASTENER AND DRIVER THEREFOR

[75] Inventor: Ralph A. Bolen, London, Ohio

[73] Assignee: John Sawyer, Cincinnati, Ohio; a part interest

[21] Appl. No.: 843,727

[22] Filed: Oct. 19, 1977

[51] Int. Cl.² ............................................. B25B 15/00
[52] U.S. Cl. ................................ 145/50 D; 145/50 A; 145/61 L
[58] Field of Search .................... 145/50 D, 50 A, 64, 145/61 L, 50 B

[56] References Cited

U.S. PATENT DOCUMENTS

| 306,491 | 10/1884 | Jackman | 145/50 D |
|---|---|---|---|
| 1,371,965 | 3/1921 | York | 145/50 A |
| 1,419,100 | 6/1922 | Ayotte | 145/50 B |
| 1,486,718 | 3/1924 | Zygmunt | 145/64 X |
| 1,997,422 | 4/1935 | Lorenzen et al. | 145/50 D |
| 2,566,055 | 8/1951 | Daderko et al. | 145/50 D |
| 2,672,777 | 3/1954 | Dossie | 145/64 X |
| 2,792,039 | 5/1957 | Wing et al. | 145/50 A |
| 3,120,251 | 2/1964 | York | 145/50 A |
| 3,227,015 | 1/1966 | Tremblay | 145/64 X |
| 3,396,765 | 8/1968 | Ridenour | 145/50 A |

FOREIGN PATENT DOCUMENTS

| 10612 | 8/1880 | Fed. Rep. of Germany | 145/50 A |
|---|---|---|---|
| 362860 | 11/1922 | Fed. Rep. of Germany | 145/50 D |
| 2134738 | 1/1972 | Fed. Rep. of Germany | 145/51 |
| 7808 of | 1887 | United Kingdom | 145/50 D |
| 395165 | 7/1933 | United Kingdom | 145/50 A |

Primary Examiner—Al Lawrence Smith
Assistant Examiner—J. T. Zatarga
Attorney, Agent, or Firm—J. Warren Kinney, Jr.

[57] ABSTRACT

The head of fasteners are provided with an inverted T-slot which is engagable by the T-shaped end of a driver for precluding the accidental or unintentional disengagement of the driver from the fastener-head during insertion or removal thereof.

19 Claims, 11 Drawing Figures

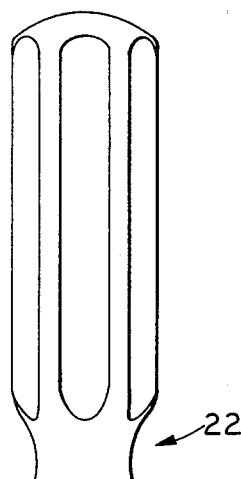
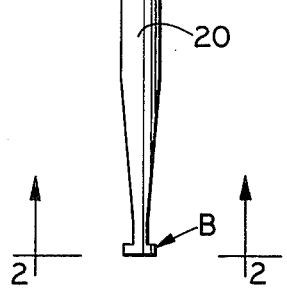
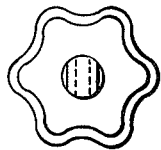
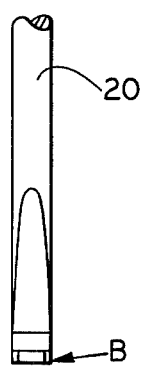
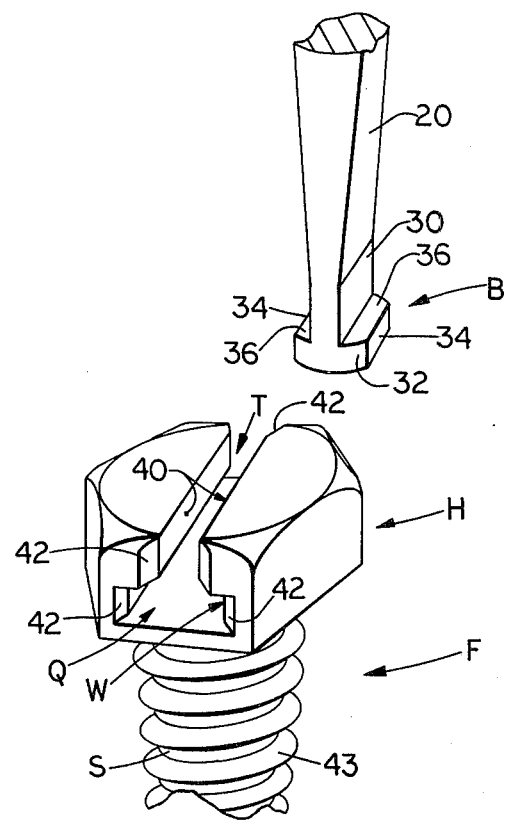
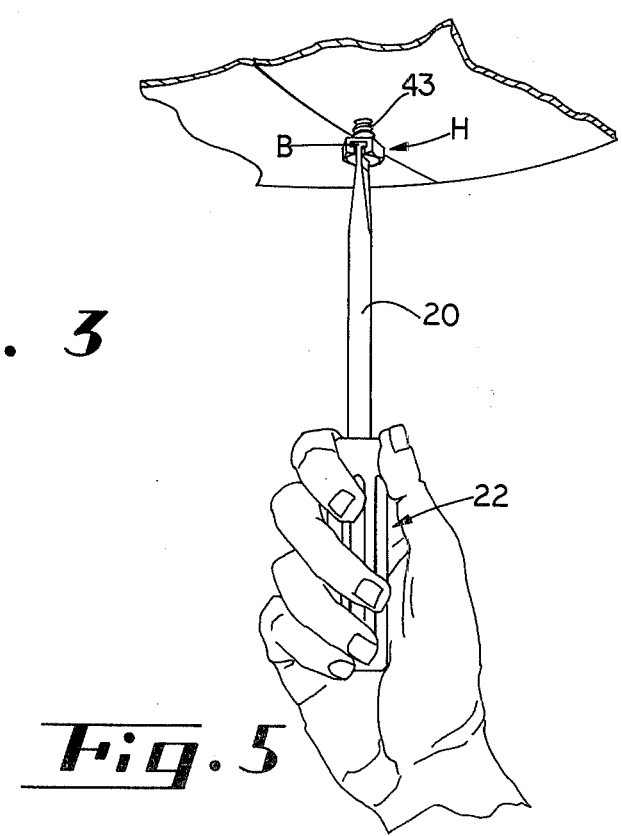
Fig. 1
Fig. 2
Fig. 3
Fig. 4
Fig. 5

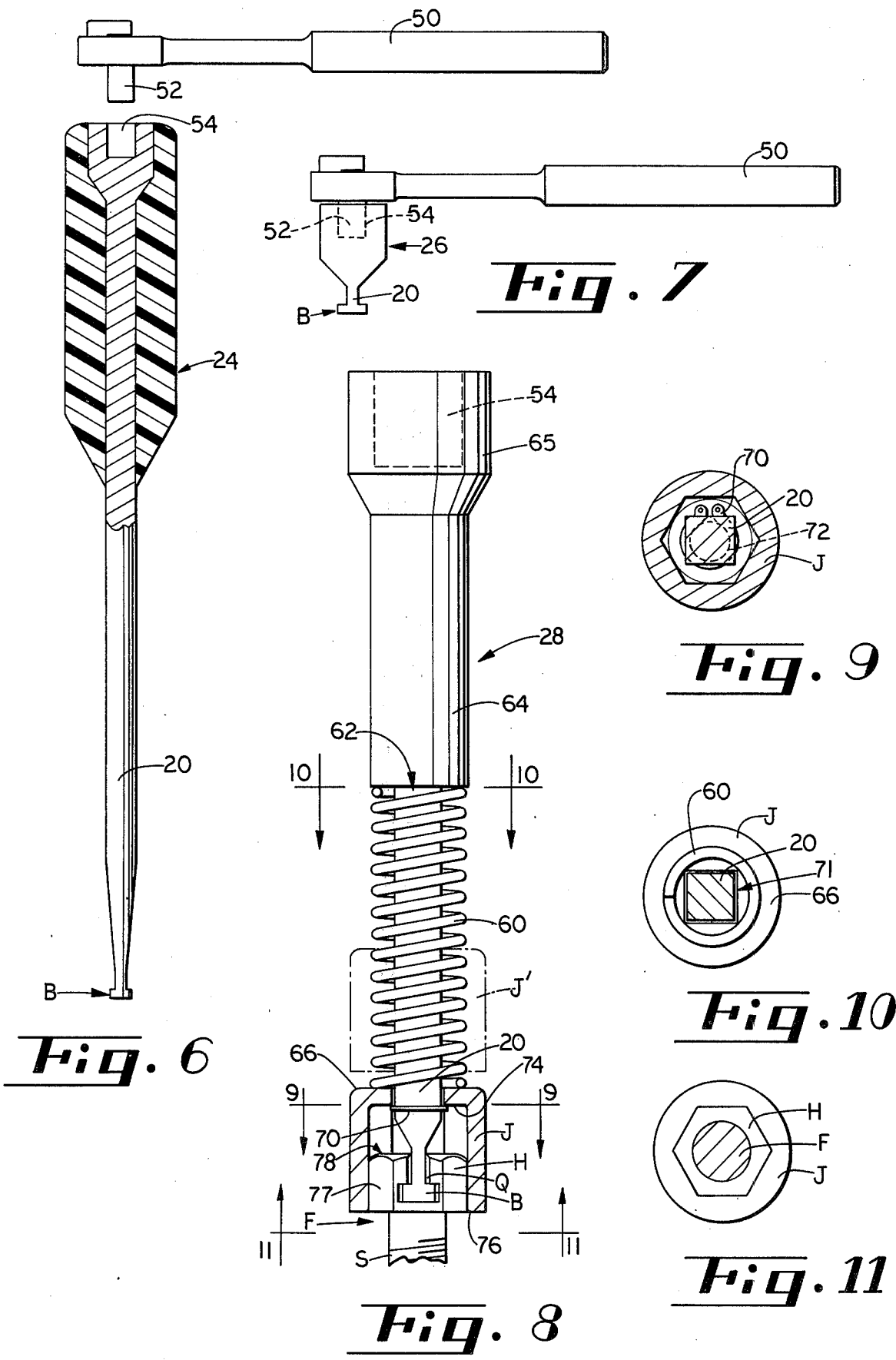

SLOT-HEAD FASTENER AND DRIVER THEREFOR

BACKGROUND OF THE INVENTION

1. Field of the Invention

The field of the invention relates to screw-type fasteners in general, the heads of which are provided with inverted T-shaped slots which are adapted to be engaged by the T-shaped blade of a driver.

2. Description of the Prior Art

Applicant is aware of the following relevant prior art:

U.S. Pat. Nos. 3,897,812 and 3,923,008 of E. T. Arnn which disclose a screw driver, the blade end of which is flared outwardly as at 32 to provide "bites" 30, the overall spacing of which are equal to the width of a rectangular slot provided in the head of a fastener, said "bites" increasing the effectiveness of the blade in gripping the vertical side walls of a slot in the screw head.

U.S. Pat. No. 1,476,653 of J. R. Stanton discloses a screw driver, the blade of which comprises two pairs of reversing beveled faces 14 which converge toward a central restricted portion 15, said blade being adapted to be inserted axially into the transverse groove 17 of a screw head 16, which groove has a narrow central portion 18 to correspond to the reversed beveled faces 14 of the blade.

U.S. Pat. No. 3,026,920 of B. H. York discloses a screw driver having a driving tip which is adapted for use with fasteners having undercut driver-receiving recesses having contours as disclosed in FIGS. 12–18 and wherein the driving tip 23 of the screw driver is shaped whereby to be introduced in an axially, end-wise direction into the recessed head of a screw fastener of the type which is adapted to be countersunk into a supporting surface.

U.S. Pat. No. 1,997,422 of H. Lorenzen, et al, discloses a countersunk screw and a driver therefor wherein the driver is adapted to be interlocked relative to a transverse slot in the screw head. The end face 12 of the driver bit is curved outwardly about a point along the lateral axis of the driver as a center, and the angle of divergence of the sides 4 from the vertical is less at the edges than at the middle of the bit whereby to provide the edge portions of the bit somewhat thinner than the width of the slot in the head of a screw. The end of the bit is adapted to be inserted edgewise into the screw slot, and after the screw has been completely driven and countersunk into the work, the driver is separated therefrom by tilting the driver so as to place an edge portion of the face of the bit in the open face of the slot after which the driver is then manipulated to force the remaining portion of the face of the driver bit to become disengaged from the screw slot. The relationship of the bit and screw slot is such that a screw may be readily carried on the end of the bit preparatory to a screwing operation, and at the end of an unscrewing operation, the screw will be carried on the end of the screw driver bit to prevent its being accidentally dropped until removed by an operator.

U.S. Pat. No. 2,566,055 of M. Daderko, et al, discloses a screw having a slotted head and a driving tool therefor wherein the screw head is provided with a transverse slot having a centrally disposed concave portion 20 and wherein the side walls of the slot are undercut to provide a dovetail cross section as illustrated in FIGS. 1 and 2 thereof. The tip of the screw driver is provided with a bit 28 having opposite side faces 30 which lie in convergent planes as they recede from the shank 26. Faces 30 are flat so that at their convergent ends they form a relatively narrow edge which is adapted to enter the slot in the screw head. A lip 32 extends outwardly from one face 30 of bit 28, said lip adapted to engage an undercut portion of the groove in the screw in substantial alignment with shank 26. The tip of the screw driver is engageable with and removable from the screw slot by tilting the shank of the screw driver as in FIG. 2, whereby to initially introduce extending lip 32 into the slot whereby said lip will be disposed in contacting relationship with one side of the dovetail groove of the screw head when the shank of the screw driver is disposed in axial alignment with the screw.

U.S. Pat. No. 306,492 of G. W. Jackman discloses a screw, the head of which is provided with a pair of transverse splines such as illustrated in FIGS. 2 and 4, the central undercut portions of which are adapted to be selectively engaged by undercut portions of the jaws of a screw driver wherein said jaws are movable toward and away from one and other from non-engaging to engaging relationship with the central undercut portions of the pair of splines in the screw head. When the jaws of the driver are disposed in engagement with the spline portion of the screw head, accidental or unintentional disengagement of the screw is effectively precluded.

U.S. Pat. No. 3,825,048 of M. K. Triska discloses a screw head and driving tool therefor which are releasably coupled together by means of a pair of radially shiftable anchors each of which have an outwardly and downwardly tapered outer surface 25, and an inner axial surface 28, said anchors are held in alternate engagement and disengagement with a complimentary screw slot by a driver blade 22 shiftable longitudinally between said anchors. The screw slot is undercut to prevent displacement of the tapered driving tool from the screw head when the anchors are set in engaged condition and to permit disengagement when the anchors are set in disengaged condition.

U.S. Pat. No. 449,037 of G. T. Chapman discloses a wood screw the head of which is provided with a transversely extending slot, the lower portion of which is defined by a cylindrical groove the radius of which is greater than the width of the upper portion of the slot. The reason for the slot is to strengthen the head against the tendency of breakage by the screw driver and so that it will retain the filling of putty generally applied in finishing interior work.

U.S. Pat. No. 2,301,590 of R. Signorelli discloses a screw driver which comprises a pair of laterally spaced bit members 4 the lower end of each of which terminates in outturned lips 6 which are adapted to be received within the undercut transverse slot B in the head of a screw, the outer ends of each of said bits are forced apart as the bits are shifted upwardly axially to and along a flat shank 2 which is disposed between said bit members. The bit members are thus forced apart, engage and substantially fill the undercut slot of the fastener member.

U.S. Pat. No. 2,684,094 of J. Lissy discloses a non-slip screw driver and screw head wherein the bit of the screw driver is provided with outwardly flared projections 17 and 18 which are adapted to fill undercut spaces 15 and 16 of the opposite walls 13 and 14 of the slot 12 in the screw head 11. The flared projections 17 and 18 of the screw driver engage the aforesaid undercut space of the side walls of the slot of the head incident to turning of the screw driver after it has been introduced in an endwise axial direction into the screw slot.

U.S. Pat. No. 1,782,981 of J. A. Anderson and U.S. Pat. No. 1,741,349 of R. R. Sullivan each relate to and disclose screw drivers the bits of which have been provided with serrations which are adapted to abut against the walls of a slot in the head of a fastener.

U.S. Pat. No. 2,808,087 of R. M. Vaughn; U.S. Pat. No. 3,120,251 of B. H. York; and U.S. Pat. No. 2,677,985 of R. M. Vaughn each relate to and disclose screw drivers the bits of which are shaped whereby to selectively and interlockingly engage the transverse slots of the head of fasteners wherein the bits of the screw drivers are inserted in an endwise axial direction into the screw head slots.

BRIEF DESCRIPTION OF THE DRAWINGS

FIG. 1 is a side plan view of a screw driver which embodies the teachings of the present invention.

FIG. 2 is a bottom view taken on line 2—2 of FIG. 1.

FIG. 3 is a front view of the lower end of the screw driver of FIG. 1.

FIG. 4 is a perspective view of the lower end of a screw driver and the head portion of a fastener embodying the teachings of the present invention.

FIG. 5 is a perspective view illustrating the manner in which the subject fastener and screw driver are utilized in exerting an upward screwing action and/or downward unscrewing action to a fastener.

FIG. 6 is a view similar to FIG. 1 illustrating a modified form of screw driver.

FIG. 7 is a side view illustrating a modification of the drivehandle for the screw driver of FIG. 6.

FIG. 8 is a side view partly in section, disclosing a second modification of the invention wherein the bit of a driver is associated with a socket head for simultaneously engaging both the center slot and the outer peripheral edges of the head of a fastener.

FIG. 9 is a view taken on line 9—9 of FIG. 8.

FIG. 10 is a view taken on line 10—10 of FIG. 8.

FIG. 11 is a view taken on line 11—11 of FIG. 8.

DESCRIPTION OF THE PREFERRED EMBODIMENT

In the drawings the numeral 20 designates the shank of a driver such as the screw driver 22 of FIGS. 1 and 5 or the modified drivers 24 and 28 of FIGS. 6, 7, and 8.

As best illustrated in FIG. 4, shank 20 terminates in a bit B which comprises a substantially rectangular portion 30, the lower end of which terminates in an outwardly projecting portion 32 wherein portions 30 and 32 collectively constitute and define a substantially T-shaped bit wherein the lower portion 32 includes upstanding, substantially parallel, laterally spaced side walls 34 which depend from upper transverse surfaces 36.

The letter F denotes generally a fastener which may comprise a bolt, screw, or other rotatable fastener element which includes a threaded shank S and a head H.

Head H is provided with an inverted T-shaped slot Q which is defined by an elongate upper throat portion T defined by laterally spaced parallel side walls 40 each of which are spaced apart by dimensions slightly greater than the width of portion 30 of bit B. Throat T is in open communication with a wider slot W which, as illustrated, extends completely through the head H in a transverse, diametric direction. If desired, the outer ends of the upper and lower slots may be tapered as at 42 for facilitating the sidewise insertion of bit B of a driver 20 into the slotted head of a fastener member.

After bit B has been associated with head H, such as, by way of example, as illustrated in FIG. 5, the fastener will be secured to and carried by bit B against accidental or unintentional dislodgment whereby the fastener may be easily manipulated for insertion into a bolt or whereby to be screwed into an opening in one or more elements to be interconnected by said fastener.

It will be noted that by reason of the positive interlocking relationship which is affected between bit B and the slot of the fastener head H, a positive downward, unscrewing force may be applied to a fastener incident to the unscrewing or withdrawal of such a fastener from a "fastened position."

With particular reference now to FIGS. 6 and 7, it will be noted that an increased turning torque can be applied to shank 22 of a driver by means of handles 50, one end of each of which terminate in a downwardly projecting driver member 52 which is receivable within a complimentary socket 54 located in the upper end of a drive which includes a shank 20 and a bit B.

With particular reference now to FIGS. 8 through 11, I have disclosed a combination driver which comprises the screw driver bit B of FIGS. 1-7 in combination with socket J which is secured to and carried by the noncircular shank 20 and for endwise, axial movement therealong against the counterforce of a spring 60 interposed between the lower surface 62 of handgrip member 64 and the upper surface 66 of socket J. A snap ring 70, or the like, may be secured to and carried by a groove 72 provided in shank 20 whereby to engage the inner surface 74 of socket J, as illustrated in FIG. 8 for limiting the fully advanced position of socket J with respect to shank 20 and bit B.

Socket J is adapted to be associated with the "flats" 77 of head H of a fastener F incident to the elevation or endwise movement thereof against the counterforce of spring 60, to an elevated, retracted position J' whereby the lower end 76 of the socket will clear the upper surface 78 of fastener head H and for exposing bit B in order that said bit may be inserted by a transverse movement into transverse slot Q in head H of fastener F after which socket S may be released from its elevated, retracted position J' to the fully lowered or advance position illustrated in FIG. 8 whereby a positive turning torque may be applied in either direction to the head H of fastener F via the centrally disposed transverse inverted T-shaped slot Q and flats 77.

It will be noted that the aforesaid driving connection or association with head H effectively precludes the accidental or unintentional disengagement of the driver means from head H of fastener F and that said connection enables an operator to apply an endwise axial force in either direction to said fastener head.

The upper end of end handgrip 64 may be enlarged as at 65 whereby to accommodate an internal socket 54 adapted to receive a driver 52 of a handle 50 for imparting rotary motion to the handgrip.

As clearly illustrated in FIG. 10 the upper end of socket J is provided with an opening 71 which is dimensioned for sliding engagement with the noncircular outer surface of shank 20.

From the foregoing it will be noted that I have thus provided simple yet highly effective cooperative means in the head of a fastener and on the bit of a driver whereby the driver is securely, though releasably, secured to a fastener against accidental or unintentional dislodgment therefrom and wherein a positive endwise axial force may be applied to the fastener via the driver without impairing the interconnection between the fastener head and bit of the driver.

What is claimed is:

1. A slot head fastener and driver therefor comprising:
   a slot head fastener having a threaded shank and a head, said head being polygonal in shape to have a plurality of flats and having a slot defined therein which is in the shape of an inverted T, said slot having a first section defined to extend transversely of said head and a throat section intersecting said first section, said throat section being defined by a pair of laterally spaced parallel side walls which are spaced apart to define a bit receiving gap therebetween, said slot and said throat having tapered portions to faclitate entrance and exit of a bit into said slot; and
   a driver for engaging said slot head fastener, said driver including a torquing member having a projecting driver member thereon, a handgrip member having an internal socket defined therein at one end thereof, said handgrip member being sized to be gripped by a user's hand with the user's other hand gripping said torquing member, said internal socket being shaped to receive said torquing member projecting driver member, a shank connected at one end thereof on another end of said handgrip member, a socket member mounted on said shank to be axially movable thereon and having a shape corresponding to the shape of said slot head fastener polygonal head to engage said flats to impart turning torque to said fastener, a spring mounted on said shank to yieldably bias said socket member toward another end of said shank, a bit on said shank another end, said bit including a rectangular portion sized to be received in said slot head fastener gap, and a projecting portion which is located and sized to be received in said slot head fastener first section, said bit portions forming a T-shaped member which is received in said slotted head fastener inverted T-shaped slot to form a driving connection between said driver and said fastener whereby torque developed by said driver is imparted to said fastener via said socket member and said bit.

2. A device as called for in claim 1, wherein the opposite ends of the inverted T-shaped slot in the fastener head are chamfered.

3. A device as called for in claim 1, wherein the relationship between the inverted T-slot of the fastener head and the T-shaped bit of the driver is such that when the bit is housed within the slot the fastener is securely, though releasably, anchored to and in axial alignment with the driver and whereby tilting or cocking of the driver relative to the fastener is precluded.

4. A device as called for in claim 3, wherein side, top and bottom walls of the inverted T-shaped slot in the head of the fastener are defined by substantially rectangular, flat, co-planar surfaces, and wherein side, top, and bottom walls of the T-shaped bit are defined by substantially rectangular, flat, co-planar surfaces, and wherein the relationship between the said slot and bit is such that the bit is inserted into and removed from the slot only in an endwise direction.

5. A driver as called for in claim 1, wherein the shank includes an offset remote from the T-shaped bit, and wherein the spring is disposed between said offset and the upper surface of the socket.

6. A driver as called for in claim 1, wherein the shank is provided with an abutment adjacent but spaced upwardly from the bit, said abutment engaged by the socket when in its fully advanced position for limiting the extent of travel of the socket toward the bit of the shank.

7. The slot head fastener as defined in claim 1 wherein said shank is non-circular.

8. The slot head fastener as defined in claim 7 wherein said socket has a shank receiving opening defined therein shaped to correspond to said non-circular shank.

9. A driver for a slot head fastener comprising:
   a shaft with one end thereof forming a drivable end and including an abutment on said shaft, a socket on another end of said shaft and a spring surrounding said shaft and engaging said abutment and said socket to urge said socket toward said shaft another end, said driver including a fastener engaging bit on said shaft another end, said bit being T-shaped to cooperatively engage a correspondingly shaped slot defined in a slot head fastener driven by the driver, said socket surrounding said bit on all sides except when said socket is manually retracted away from said another end against the urging of said spring, said socket being shaped to cooperatively engage the fastener about the outer periphery of such fastener such that with said bit engaged in the slot of the slot head fastener and said socket engaged about the outer periphery of such slot head fastener, such fastener is held on the driver and disengagement of such fastener from the driver is prevented in a direction axially of said shaft as well as transversely of said shaft whereby a fastener may be securely held in driving connection with the driver against accidental or unintentional disengagement from the driver.

10. The driver of claim 9 wherein the slot of the slot head fastener includes a first section extending transversely of the head and a second section intersecting the first section so that the slot is in the form of an inverted T.

11. A device as called for in claim 9, wherein that end of the fastener-drive which is remote from the T-shaped bit includes means which are securely, though releasably, engaged by means for augmenting the turning torque applied to said driver.

12. The driver of claim 9 wherein the slot head fastener includes a threaded shank.

13. The driver of claim 9 further including a handgrip member on said shaft, said handgrip member being sized and shaped to be gripped by a user's hand.

14. The driver of claim 13 wherein said shaft has an internal socket defined therein and further including a torquing member having a driver member thereon which is received in said internal socket.

15. The driver of claim 9 wherein said socket has a polygonal shape.

16. The driver of claim 15 wherein said shaft is polygonal.

17. The driver of claim 15 wherein the slot of the slot head fastener includes tapered portions to facilitate entrance and exit of said bit into the slot.

18. A slot head fastener and driver therefor comprising:

a slot head fastener having a head having a slot defined therein, said slot including a first section extending transversely of said head and a second section intersecting said first section so that said slot is in the form of an inverted T, said head having an outer periphery; and a driver for engaging said slot head fastener, said driver including a shaft having one end thereof forming a drivable end and further including an abutment thereon, a socket on another end of said shaft and a spring surrounding said shaft and engaging said abutment and said socket to urge said socket toward said shaft another end, said driver including a fastener engaging bit on said shaft another end, said bit being T-shaped to cooperatively engage said slot head inverted T-shaped slot, said socket being shaped to cooperatively engage said slot head fastener head outer periphery on all sides thereof except when said socket is manually retracted away from said shaft another end against the urging of said spring, said driver bit engaging said slot head fastener slot and said socket engaging said fastener head outer periphery so that said fastener is held on said driver and disengagement of said fastener from said driver is prevented in a direction axially of said shaft by engagement of said T-shaped bit in said inverted T-shaped slot and in a direction transversely of said shaft by engagement of said socket with said head outer periphery whereby said fastener is securely held in driving connection with said driver against accidental or unintentional disengagement thereof from said driver.

19. The slot head fastener and driver defined in claim 18 wherein said fastener head outer periphery is polygonal.

* * * * *